(12) United States Patent
Chrabascz et al.

(10) Patent No.: US 10,465,694 B2
(45) Date of Patent: Nov. 5, 2019

(54) FAN INLET DIFFUSER HOUSING WITH CONDUCTIVE COMPOSITE BODY

(71) Applicant: Hamilton Sundstrand Corporation, Charlotte, NC (US)

(72) Inventors: Eric Chrabascz, Longmeadow, MA (US); Michael E. Folsom, Ellington, CT (US); Georgina Tucsa, Hartford, CT (US); Murtuza Lokhandwalla, South Windsor, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 276 days.

(21) Appl. No.: 15/480,009

(22) Filed: Apr. 5, 2017

(65) Prior Publication Data
US 2018/0291916 A1 Oct. 11, 2018

(51) Int. Cl.
| | |
|---|---|
| *F04D 29/54* | (2006.01) |
| *F04D 29/02* | (2006.01) |
| *F01D 9/00* | (2006.01) |
| *F01D 9/02* | (2006.01) |
| *F01D 25/14* | (2006.01) |
| *F01D 25/16* | (2006.01) |
| *F01D 25/24* | (2006.01) |
| *B64D 13/04* | (2006.01) |
| *B64D 13/08* | (2006.01) |
| *F04D 29/64* | (2006.01) |
| *B64D 13/06* | (2006.01) |

(52) U.S. Cl.
CPC ........... *F04D 29/023* (2013.01); *B64D 13/04* (2013.01); *B64D 13/08* (2013.01); *F01D 9/00* (2013.01); *F01D 9/02* (2013.01); *F01D 25/14* (2013.01); *F01D 25/16* (2013.01); *F01D 25/24* (2013.01); *F04D 29/541* (2013.01); *F04D 29/644* (2013.01); *B64D 2013/0662* (2013.01); *F05D 2300/603* (2013.01); *Y02T 50/672* (2013.01); *Y02T 50/675* (2013.01)

(58) Field of Classification Search
CPC ................. F04D 29/023; F04D 29/403; F04D 29/29522; F04D 29/541; F04D 29/545; B64D 13/08; F05D 2300/602
See application file for complete search history.

(56) References Cited

U.S. PATENT DOCUMENTS

| | | | |
|---|---|---|---|
| 4,398,234 A | 8/1983 | Brick et al. | |
| 5,133,194 A * | 7/1992 | Army, Jr. | ............... B64D 13/00 415/117 |
| 5,570,265 A | 10/1996 | Smith | |
| 6,812,276 B2 | 11/2004 | Yeager | |
| 7,250,477 B2 | 7/2007 | Guo et al. | |

(Continued)

OTHER PUBLICATIONS

Search Report dated Aug. 16, 2018 in U310912EP, EP Application No. 18165976, 7 pages.

*Primary Examiner* — Ninh H. Nguyen
(74) *Attorney, Agent, or Firm* — Cantor Colburn LLP

(57) ABSTRACT

A method and system to provide a fan inlet diffuser housing including a housing body formed from a composite material, wherein the composite material includes a base fiberglass material having a first conductivity, a conductive material having a second conductivity, wherein the second conductivity is greater than the first conductivity, and a binder that bonds the base fiberglass material and the conductive material.

18 Claims, 2 Drawing Sheets

(56) References Cited

U.S. PATENT DOCUMENTS

| | | | |
|---|---|---|---|
| 7,832,983 B2 | 11/2010 | Kruckenberg et al. | |
| 8,630,079 B2 | 1/2014 | Le Morvan | |
| 8,687,342 B2 | 4/2014 | Rawlings et al. | |
| 8,834,098 B2 * | 9/2014 | Glaspey | F01D 9/02 |
| | | | 415/119 |
| 8,882,023 B2 | 11/2014 | Brown | |
| 9,057,386 B2 * | 6/2015 | Binek | F04D 29/522 |
| 9,132,919 B2 * | 9/2015 | McAuliffe | B64D 13/06 |
| 9,140,291 B2 | 9/2015 | Yoon et al. | |
| 9,221,547 B2 | 12/2015 | Chao et al. | |
| 9,266,622 B2 | 2/2016 | Eddy | |
| 9,353,685 B2 * | 5/2016 | Kling | F02C 7/05 |
| 9,533,770 B2 | 1/2017 | Quayle et al. | |
| 9,989,070 B2 * | 6/2018 | Beers | F04D 19/00 |
| 2013/0084176 A1 | 4/2013 | Beers et al. | |
| 2015/0114677 A1 | 4/2015 | Zafari | |
| 2016/0083099 A1 * | 3/2016 | Beers | F04D 25/024 |
| | | | 62/508 |
| 2016/0097401 A1 | 4/2016 | Beers et al. | |
| 2016/0214735 A1 | 7/2016 | Garcia et al. | |

\* cited by examiner

FAN INLET DIFFUSER HOUSING WITH CONDUCTIVE COMPOSITE BODY

BACKGROUND

The subject matter disclosed herein relates to fan inlet diffuser housings, and more particularly, fan inlet diffuser housings formed with a conductive composite body.

Typically, in modern commercial aircraft, an air cycle machine (ACM) is provided to suitably condition air to be supplied to the cabin or cockpit or other locations for occupant comfort. Air cycle machines include a fan inlet diffuser housing to receive the flow of intake air drawn in by the air cycle machine. Often, high velocity air flow through the fan inlet diffuser housing can create static electricity build up on such fan inlet diffuser housings, requiring a conductive path between the fan inlet diffuser housing and a suitable ground. The addition of electrical bonding can require additional components, complexity, and assembly.

BRIEF SUMMARY

According to an embodiment, a fan inlet diffuser housing includes a housing body formed from a composite material, wherein the composite material includes a base fiberglass material having a first conductivity, a conductive material having a second conductivity, wherein the second conductivity is greater than the first conductivity, and a binder that bonds the base fiberglass material and the conductive material.

According to an embodiment, an air cycle machine system includes an air cycle machine, and a fan inlet diffuser housing coupled to the air cycle machine, the fan inlet diffuser housing including, a housing body formed from a composite material, wherein the composite material includes a base fiberglass material having a first conductivity, a conductive material having a second conductivity, wherein the second conductivity is greater than the first conductivity, and a binder that bonds the base fiberglass material and the conductive material.

According to an embodiment, a method for forming a fan inlet diffuser housing includes introducing a conductive material having a second conductivity to a base fiberglass material having a first conductivity and a binder to form a composite material, wherein the second conductivity is greater than the first conductivity, and forming a housing body of the fan inlet diffuser housing from the composite material.

Technical function of the embodiments described above includes that the composite material includes a base fiberglass material having a first conductivity, a conductive material having a second conductivity, wherein the second conductivity is greater than the first conductivity, and a binder that bonds the base fiberglass material and the conductive material.

Other aspects, features, and techniques of the embodiments will become more apparent from the following description taken in conjunction with the drawings.

BRIEF DESCRIPTION OF THE DRAWINGS

The subject matter is particularly pointed out and distinctly claimed in the claims at the conclusion of the specification. The foregoing and other features, and advantages of the embodiments are apparent from the following detailed description taken in conjunction with the accompanying drawings in which like elements are numbered alike in the FIGURES:

DETAILED DESCRIPTION

Figure 1:
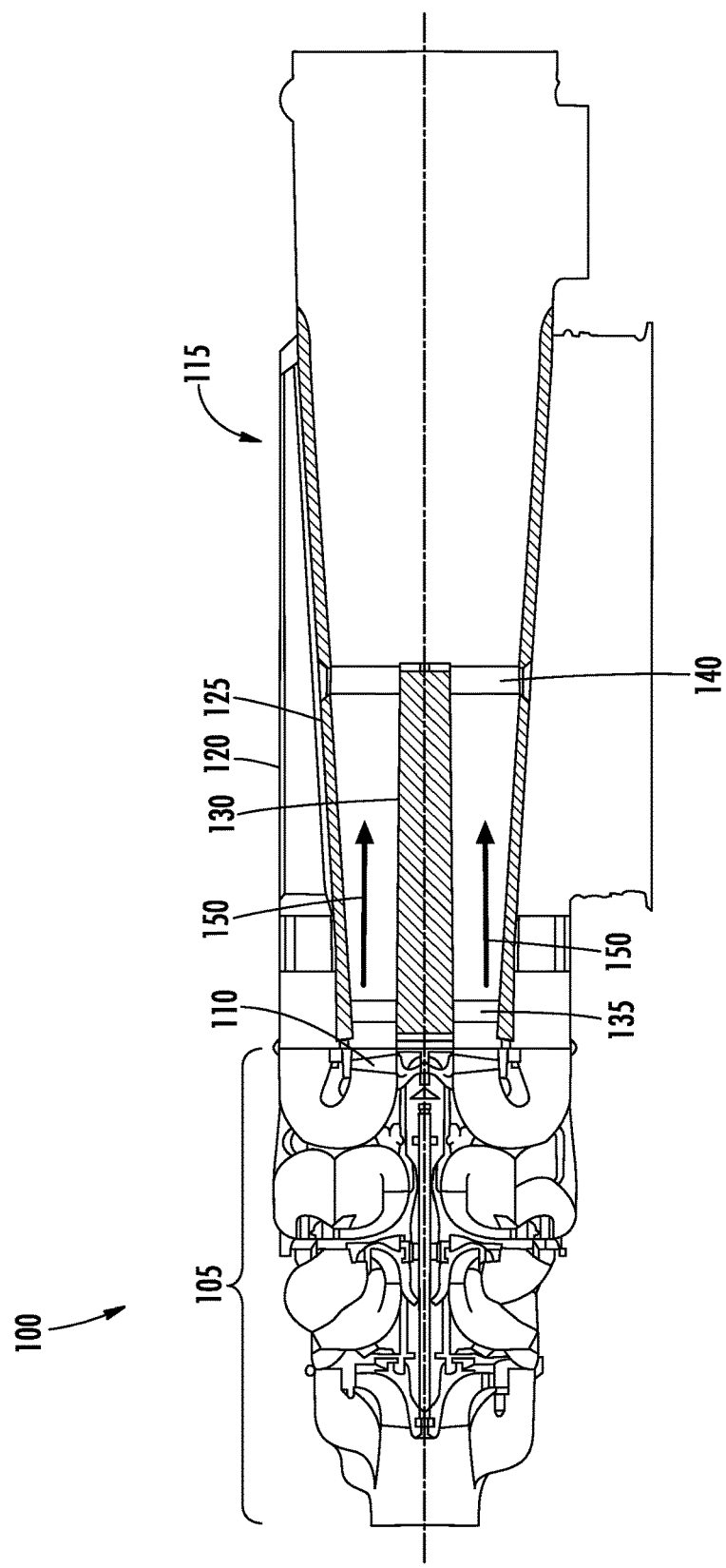
FIG. 1 illustrates a pictorial view of one embodiment of an air cycle machine system.

Referring to the drawings, FIG. 1 shows an air cycle machine system 100. In the illustrated embodiment, the air cycle machine system 100 includes an air cycle machine 105 coupled to a fan inlet diffuser housing 115.

In the illustrated embodiment, the air cycle machine 105 conditions a flow of pressurized air, for example bleed air from the aircraft engine, by not only regulating the pressure of the air to a desired level for cabin pressurization, but also by cooling and dehumidifying the air. The flow of compressed bleed air to be conditioned is first passed through a compressor section of the air cycle machine 105 where it is further cooled causing condensation of moisture in the air, thereby dehumidifying the air. The dehumidified air is then expanded through a turbine section of the air cycle machine 105 to reduce the pressure to a desired pressure level for delivery to its point of use, (e.g. the aircraft passenger or pilot cabin).

In the illustrated embodiment, the air cycle machine 105 drives an inlet fan 110 that draws outside air for use with heat exchangers associated with the air cycle machine 105. In the illustrated embodiment, the fan inlet diffuser housing 115 receives the airflow 150.

In the illustrated embodiment, the fan inlet diffuser housing 115 includes a housing body 120, a diffuser cone 125 disposed within the housing 120 and a center tube (center body) 130 disposed within the diffuser cone 125. The center tube 130 is disposed within the diffuser cone 125 via an inboard strut 135 and an outboard inboard strut 140. In the illustrated embodiment, the fan inlet diffuser housing 115 receives high velocity airflow 150.

In certain applications, the fan inlet diffuser housing 115 can accumulate static charge from the airflow 150. In order to prevent undesired discharge of static charge, the fan inlet diffuser housing 115 can electrically bond with the air cycle machine 105 or any other suitable component to provide an electrical bond to an electrical ground. Advantageously, by electrically bonding the fan inlet diffuser housing 115 to the electrical ground, ignition of fuel vapors can be avoided.

Figure 2:
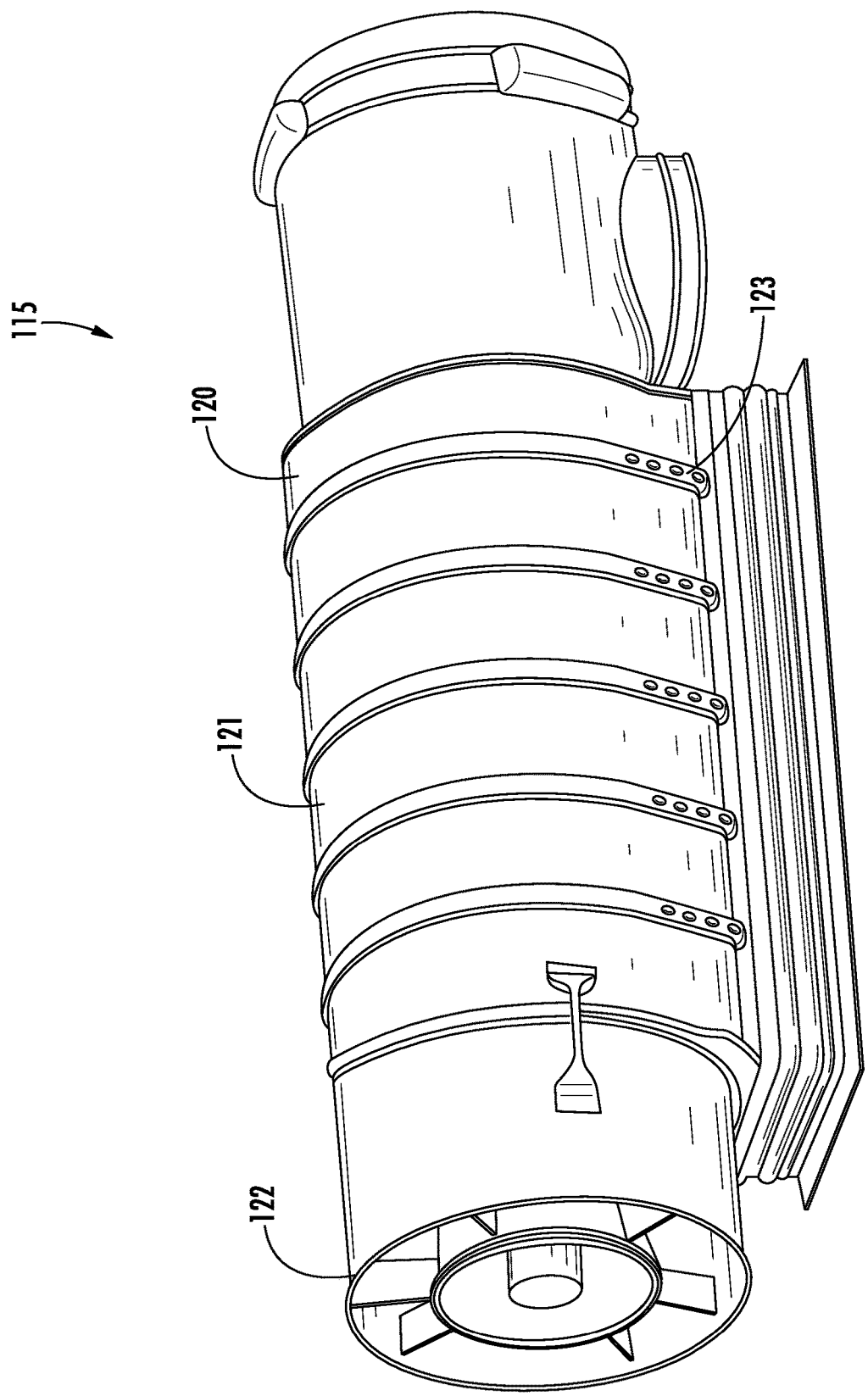
FIG. 2 is an isometric view of a fan inlet diffuser housing for use with the air cycle machine system of FIG. 1.

Referring to FIG. 2, the housing body 120 of the fan inlet diffuser housing 115 is shown. In the illustrated embodiment, the housing body 120 includes an exterior surface 121, a flange 122, and bolt holes 123. In the illustrated embodiment, the housing body 120 provides structure to the fan inlet diffuser housing 115. Further, in the illustrated embodiment, the housing body 120 is formed from a composite material that is electrically conductive to provide electrical bonding to an electrical ground.

In the illustrated embodiment, the flange 122 attaches the fan inlet diffuser housing 115 to the air cycle machine 105. In certain embodiments, V-bands are utilized with the flange 122 to attach the fan inlet diffuser housing 115 to the air cycle machine 105. Further, in the illustrated embodiment, the flange 122 can provide a conductive path to electrically bond the fan inlet diffuser housing 115 to the air cycle machine 105 and to the electrical ground via the conductive properties of the housing body 120.

In the illustrated embodiment, the housing body 120 can include bolt holes 123 formed therethrough. The bolt holes 123 can allow bolts or other fasteners to pass therethrough to allow the fan inlet diffuser housing 115 to be affixed to an aircraft structure. In certain embodiments, the bolt holes 123 can provide a conductive path to electrically bond the fan inlet diffuser housing 115 to the aircraft or any other suitable electrical ground via the bolts or other fasteners disposed within the bolt holes 123.

In the illustrated embodiment, the housing body 120 is formed from a composite material. In certain embodiments, the composite material is formed from a base material, a conductive material, and a binding agent. In the illustrated embodiment, the composite material is formed from a base fiberglass or fiber material. In certain embodiments, the composite material can be bound by binder, including, but not limited to epoxy, bismaleimide, polyimide or any other suitable binder. In certain embodiments, the binder can be pre-impregnated into the base material.

In the illustrated embodiment, the conductive material is introduced into the composite material during formation of the housing body 120. In the illustrated embodiment, the conductive material has a greater conductivity than the base material to allow for an electrically conductive housing body 120. In the illustrated embodiment, a carbon veil can be introduced into the composite material to provide conductive properties to the composite material.

The carbon veil can be a thin ply of discontinuous carbon fibers having a random orientation. The carbon veil can be held together with a light binder. In certain embodiments the carbon veil can utilize any suitable binder, including, but not limited to polyesters, styrene—acrylic, phenoxy, or polyurethane binders. In certain embodiments, the carbon fibers composing the veil can be coated with a metal coating, wherein the metal coating includes, but is not limited to nickel or copper. In certain embodiments, the carbon veil can be formed from polyacrylonitrile or pitch based or recycled carbon fiber, with the carbon fiber having a typical length of 0.25 inches or ranging between 0.2 and 0.3 inches in length, and a typical diameter of 7 micrometers or ranging from 5 to 10 micrometers. In certain embodiments, the carbon veil can have a typical areal weight of 10 grams/square meter and can range between 8-34 grams/square meter. Once the carbon veil is molded into the composite, the thickness of the carbon veil may be between 0.002 inches and 0.003 inches thick. Advantageously, the use of carbon veil adds minimal thickness and weight to the composite material while withstanding high temperatures, in excess of 375 degrees F. Further, carbon veil can be easily incorporated with the composite materials of the housing body 120.

In certain embodiments, the composite material can include a metallic mesh including, but not limited to, an aluminum mesh or a copper mesh that is introduced during the formation of the housing body 120.

Advantageously, by incorporating a conductive material into the composite material, the assembly of the fan inlet diffuser housing 115 is simplified by reducing any additional process steps, coatings, etc., after the housing body 120 is formed, while allowing for electrical bonding to prevent static discharge.

The terminology used herein is for the purpose of describing particular embodiments only and is not intended to be limiting of the embodiments. While the description of the present embodiments has been presented for purposes of illustration and description, it is not intended to be exhaustive or limited to the embodiments in the form disclosed.

Many modifications, variations, alterations, substitutions or equivalent arrangement not hereto described will be apparent to those of ordinary skill in the art without departing from the scope and spirit of the embodiments. Additionally, while various embodiments have been described, it is to be understood that aspects may include only some of the described embodiments. Accordingly, the embodiments are not to be seen as limited by the foregoing description, but are only limited by the scope of the appended claims.

What is claimed is:

1. A fan inlet diffuser housing, comprising:
a housing body formed from a composite material, wherein the composite material includes a base fiberglass material having a first electrical conductivity, a conductive material having a second electrical conductivity, wherein the second electrical conductivity is greater than the first electrical conductivity, and a binder that bonds the base fiberglass material and the conductive material, wherein the housing body includes a plurality of bolt holes.

2. The fan inlet diffuser housing of claim 1, wherein the conductive material is a carbon fiber veil material.

3. The fan inlet diffuser housing of claim 2, wherein the carbon veil material is a metal coated carbon fiber veil material.

4. The fan inlet diffuser housing of claim 1, wherein the housing body is electrically bonded to a ground.

5. The fan inlet diffuser housing of claim 1, wherein the conductive material is a metallic mesh.

6. The fan inlet diffuser housing of claim 1, wherein the binder is epoxy, bismaleimide, or polyimide.

7. The fan inlet diffuser housing of claim 1, wherein the housing body provides a conductive path to the plurality of bolt holes.

8. The fan inlet diffuser housing of claim 1, wherein the housing body includes a flange.

9. The fan inlet diffuser housing of claim 1, wherein the housing body provides a conductive path to the flange.

10. An air cycle machine system, comprising:
an air cycle machine; and
a fan inlet diffuser housing coupled to the air cycle machine, the fan inlet diffuser housing including:
a housing body formed from a composite material, wherein the composite material includes a base fiberglass material having a first electrical conductivity, a conductive material having a second electrical conductivity, wherein the second electrical conductivity is greater than the first electrical conductivity, and a binder that bonds the base fiberglass material and the conductive material, wherein the housing body includes a plurality of bolt holes.

11. The air cycle machine system of claim 10, wherein the conductive material is a carbon fiber veil material.

12. The air cycle machine system of claim 11, wherein the carbon veil material is a metal coated carbon fiber veil material.

13. The air cycle machine system of claim 10, wherein the conductive material is a metallic mesh.

14. The air cycle machine system of claim 10, wherein the housing body provides a conductive path to the air cycle machine.

15. The air cycle machine system of claim 10, wherein the housing body provides a conductive path to the plurality of bolt holes.

16. The air cycle machine system of claim 10, wherein the housing body includes a flange to couple the fan inlet diffuser housing to the air cycle machine.

17. The air cycle machine system of claim 16, wherein the housing body provides a conductive path to the flange.

18. A method for forming a fan inlet diffuser housing, the method comprising:
- introducing a conductive material having a second electrical conductivity to a base fiberglass material having a first electrical conductivity and a binder to form a composite material, wherein the second electrical conductivity is greater than the first electrical conductivity; and
- forming a housing body of the fan inlet diffuser housing from the composite material,
- wherein the forming of the housing body comprises forming the housing body to include a plurality of bolt holes.

* * * * *